US012013840B2

(12) United States Patent
Shrivastava et al.

(10) Patent No.: US 12,013,840 B2
(45) Date of Patent: Jun. 18, 2024

(54) DYNAMIC DISCOVERY AND CORRECTION OF DATA QUALITY ISSUES

(71) Applicant: INTERNATIONAL BUSINESS MACHINES CORPORATION, Armonk, NY (US)

(72) Inventors: Shrey Shrivastava, White Plains, NY (US); Anuradha Bhamidipaty, Yorktown Heights, NY (US); Dhavalkumar C. Patel, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 17/075,617

(22) Filed: Oct. 20, 2020

(65) Prior Publication Data

US 2021/0326334 A1 Oct. 21, 2021

Related U.S. Application Data

(60) Provisional application No. 63/011,990, filed on Apr. 17, 2020.

(51) Int. Cl.
*G06F 16/23* (2019.01)
(52) U.S. Cl.
CPC ...... *G06F 16/2379* (2019.01); *G06F 16/2365* (2019.01)
(58) Field of Classification Search
CPC ............. G06F 16/2379; G06F 16/2365
See application file for complete search history.

(56) References Cited

U.S. PATENT DOCUMENTS 7,251,693 B2  7/2007 Stull et al.
7,281,001 B2  10/2007 Caulfield et al.
(Continued)

FOREIGN PATENT DOCUMENTS

CN  104731843 A  6/2015
CN  104809594 B  2/2019
(Continued)

OTHER PUBLICATIONS

Mell, P. et al., "Recommendations of the National Institute of Standards and Technology"; NIST Special Publication 800-145 (2011); 7 pgs.
(Continued)

*Primary Examiner* — Robert W Beausoliel, Jr.
*Assistant Examiner* — Mohammad S Bhuyan
(74) *Attorney, Agent, or Firm* — Intelletek Law Group, PLLC; Gabriel Daniel, Esq.

(57) ABSTRACT

A computing device, method, and system are provided of improving data quality to conserve computational resources. The computing device receives a raw dataset. One or more data quality metric goals corresponding to the received raw dataset are received. A schema of the dataset is determined. An initial set of validation nodes is identified based on the schema of the dataset. The initial set of validation nodes are executed. A next set of validation nodes are iteratively expanded and executed based on the schema of the dataset until a termination criterion is reached. A corrected dataset of the raw dataset is provided based on the iterative execution of the initial and next set of validation nodes.

25 Claims, 10 Drawing Sheets

(56) References Cited

U.S. PATENT DOCUMENTS

| | | |
|---|---|---|
| 8,744,994 B2 | 6/2014 | Chen et al. |
| 9,082,076 B2 | 7/2015 | Miranda et al. |
| 9,104,709 B2 | 8/2015 | Chaturvedi et al. |
| 9,275,425 B2 | 3/2016 | Guttmann et al. |
| 9,390,112 B1 | 7/2016 | Daly et al. |
| 9,600,776 B1 | 3/2017 | Daly et al. |
| 10,558,627 B2 | 2/2020 | Cassidy et al. |
| 2004/0167395 A1 | 8/2004 | Behrenbruch et al. |
| 2006/0238919 A1 | 10/2006 | Bradley |
| 2012/0123994 A1* | 5/2012 | Lowry .................. G06Q 40/00 706/52 |
| 2015/0269157 A1 | 9/2015 | Biem et al. |
| 2015/0379430 A1* | 12/2015 | Dirac .................... G06N 20/00 706/12 |
| 2016/0028921 A1* | 1/2016 | Thrasher ................. H04N 1/60 358/519 |
| 2016/0070725 A1* | 3/2016 | Marrelli ............ G06F 16/24578 707/692 |
| 2016/0267082 A1* | 9/2016 | Wong .................... G06F 16/164 |
| 2019/0155797 A1* | 5/2019 | Nath ...................... G06N 5/025 |
| 2019/0286620 A1* | 9/2019 | Al-Haimi .............. G06F 16/211 |
| 2020/0097773 A1 | 3/2020 | Hsieh et al. |
| 2020/0210389 A1* | 7/2020 | Swami ................. G06F 16/215 |
| 2021/0004350 A1* | 1/2021 | Sundaramoorthy ........................ G06F 16/1744 |

FOREIGN PATENT DOCUMENTS

| | | |
|---|---|---|
| EP | 3324309 A1 | 5/2018 |
| WO | 2015044155 A1 | 4/2015 |

OTHER PUBLICATIONS

International Search Report and Written Opinion dated Jul. 15, 2021 in related application No. PCT/EP2021/052878, 10 pgs.

* cited by examiner

DYNAMIC DISCOVERY AND CORRECTION OF DATA QUALITY ISSUES

BACKGROUND

Technical Field

The present disclosure generally relates to computer systems, and more particularly, to automated dynamic data quality assessment and correction thereof.

Description of the Related Art

From the first industrial revolution that ushered in mechanization through water and steam power to the second, where mass production and assembly lines were made possible by electricity, the present fourth industrial revolution transforms what was started in the third, which introduced computers and automation, and enhances it with smart and autonomous systems driven by big data and machine learning. As the volume of available data is increasing, the quality of the large volume of information is a salient consideration for computers that use this data for machine learning.

In recent years, due to increasing adoption of Industry 4.0, many industrial manufacturing processes are closely monitored by many sensors in real time. The quality of the data that is being used by a computing device has a salient effect in its efficiency, computational accuracy, and amount of computational resources that are used. Such particularly configured computing devices can be used, for example, for building data driven artificial intelligence (AI)-based solutions to predict machinery failure, anomaly detection, survival analysis, etc., in the Industry 4.0. However, present architectures in dealing with the vast amount of real internet of things (IoT) sensor data face various challenges. For example, the data may be very large (e.g., Big Data) and involve a large amount of computational resources of a computing device, including processing power, memory, network bandwidth, and time. The data may be noisy, the data may have missing values, the data samples may be irregular, etc. Still further, the data processed by a computing device may be heterogenous and unstructured, collectively referred to herein as being disparate (e.g., may involve time series, text, image, audio, different sample rates, etc.).

By at least one estimate, during the AI development stage, the preprocessing stage of this data takes 80% of the time in the cycle of developing an AI model. Stated differently, most of the time involved with analyzing the data relates to preparing the data such that it is in proper form to be able to prepare an AI model therefrom. Some of the challenges of using automation at the data preprocessing stage includes the potential uniqueness of each dataset and the resources involved to analyze the characteristics thereof. Existing approaches presently do not provide a tool for exhaustive data cleaning and preprocessing. Consequently, the efficiency, accuracy, and amount of resources used by a computing device are adversely affected.

An AI model development stage may have many frameworks and end-to-end solutions defined, including machine learning platforms such as sklearn, tensorflow, Tpot, H2O, and the like. However, there presently is no known end-to-end framework and/or library that can efficiently clean data.

Accordingly, what is provided herein are a methods and systems of computerized methods of dynamic discovery and correction of data quality issues. In one aspect, the teachings herein provide automation in the data preprocessing phase.

In one embodiment, the iterative process is supervised in that there is interaction and collaboration from an AI practitioner allowing them to perform quality checks of heterogenous IoT data. A wide variety of checks are provided by using an installable function library. The data quality assessment and validation discussed herein can be highly customized. In one aspect, the system described herein is modular allowing for a flexible process for data quality assessment. For example, there is flexibility to include a variety of checks and even chain them together in a way that is appropriate for the data being processed.

SUMMARY

According to various embodiments, a computing device, a non-transitory computer readable storage medium, and computer implemented method, and a system of improving data quality to conserve computational resources are provided. A raw dataset is received. One or more data quality metric goals corresponding to the received raw dataset are received. A schema of the dataset is determined. An initial set of validation nodes is determined based on the schema of the dataset. The initial set of validation nodes is executed. A next set of validation nodes is iteratively expanded and executed based on the schema of the dataset, until a termination criterion is reached. A corrected dataset of the raw dataset is provided based on the iterative execution of the initial and next set of validation nodes.

In one embodiment, each validation node includes a data quality check and one or more remediation actions.

In one embodiment, the execution of a validation node of the initial set of validation nodes includes identifying all possible remediation actions for any data quality check, transforming the data with each possible remediation action, and computing a plurality of data quality metrics (DQMs) to evaluate the transformations.

In one embodiment, the execution of a validation node includes a first stage, including performing a logical check of the raw dataset by a validator object to detect one or more anomalies in the raw dataset, and performing different data transformations by way of a corresponding operator on the raw dataset to produce a new version of data for each data transformation, to correct the one or more detected anomalies.

In one embodiment, the validation node includes a second stage including, for each new version of data produced, generating a data quality metric (DQM) by an internal quality evaluator (IQE) module, and generating a DQM for the raw dataset.

In one embodiment, each DQM of the second stage includes at least one of (i) a summary of characteristics in multiple dimensions of the corresponding new version of data produced from the raw dataset; or (ii) a gain or change information of the corresponding new version of data produced from the raw dataset.

In one embodiment, the execution of the validation node includes a third stage including, for each DQM of each new version of data produced and the DQM of the raw dataset, performing a comparison to the raw dataset to assess an improvement from the raw dataset.

In one embodiment, the execution of the validation node includes a fourth stage including selecting the operator of the new version of data produced that best meets the data quality metric goals.

In one embodiment, the operator that is selected has a highest gap between its corresponding DQM and the DQM of the raw dataset that is below a predetermined threshold to maintain a resemblance to the original data.

In one embodiment, expanding a next set of validation nodes includes at least one of determining a validation node that best achieves one or more received quality metric goals, or determining a validation node based on mining an execution information repository to find all validation nodes that usually occur together.

According to one embodiment a system includes a schema reference module configured to receive a raw dataset and to determine a schema of the raw dataset. A data synthesizer module is coupled to the schema inference module and configured to receive one or more data quality metric goals corresponding to the received raw dataset from a knowledge base. The data synthesizer module includes an initializer module configured to identify an initial set of validation nodes based on the schema of the dataset. The data synthesizer module also includes an executor module coupled to the initializer module and configured to execute the initial set of validation nodes. The data synthesizer module further includes an expander module coupled to the executor module and configured to iteratively expand and execute a next set of validation nodes based on the schema of the dataset, until a termination criterion is reached. The data synthesizer module includes a terminator module coupled to the expander module and configured to iteratively determine the next set of validation nodes to consider by the expander module and to decide when to terminate the iterative determination. There is an information repository coupled to the executor and terminator modules and configured to provide a corrected dataset of the raw dataset based on the iterative execution of the initial and next set of validation nodes.

In one embodiment, each validation node includes a data quality check and one or more remediation actions.

In one embodiment, the initial set of validation nodes are configured to identify all possible remediation actions any data quality check, transform the data with each possible remediation action, and compute a plurality of data quality metrics (DQMs) to evaluate the transformations.

In one embodiment, each validation node includes a first stage configured to perform a logical check of the raw dataset by a validator object to detect one or more anomalies in the raw dataset, and to perform different data transformations by way of a corresponding operator on the raw dataset to produce a new version of data for each data transformation, to correct the one or more detected anomalies.

In one embodiment, there is a second stage configured to, for each new version of data produced, generate a data quality metric (DQM) by an internal quality evaluator (IQE) module, and generate a DQM for the raw dataset.

In one embodiment, there is a third stage configured to, for each DQM of each new version of data produced, perform a comparison to the raw dataset to assess an improvement from the raw dataset.

In one embodiment, there is a third stage configured to select the operator of the new version of data produced that best meets the data quality metric goals.

By virtue of the concepts discussed herein a technical improvement is provided in better computational efficiency and accuracy of a computing device processing large data. These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and computerized methods of dynamic discovery and correction of data quality issues to improve computational efficiency and accuracy. By virtue of the concepts discussed herein, better computational efficiency and accuracy of a computing device processing large data is provided. Reference now is made in detail to the examples illustrated in the accompanying drawings and discussed below.

Example Architecture

Figure 1:
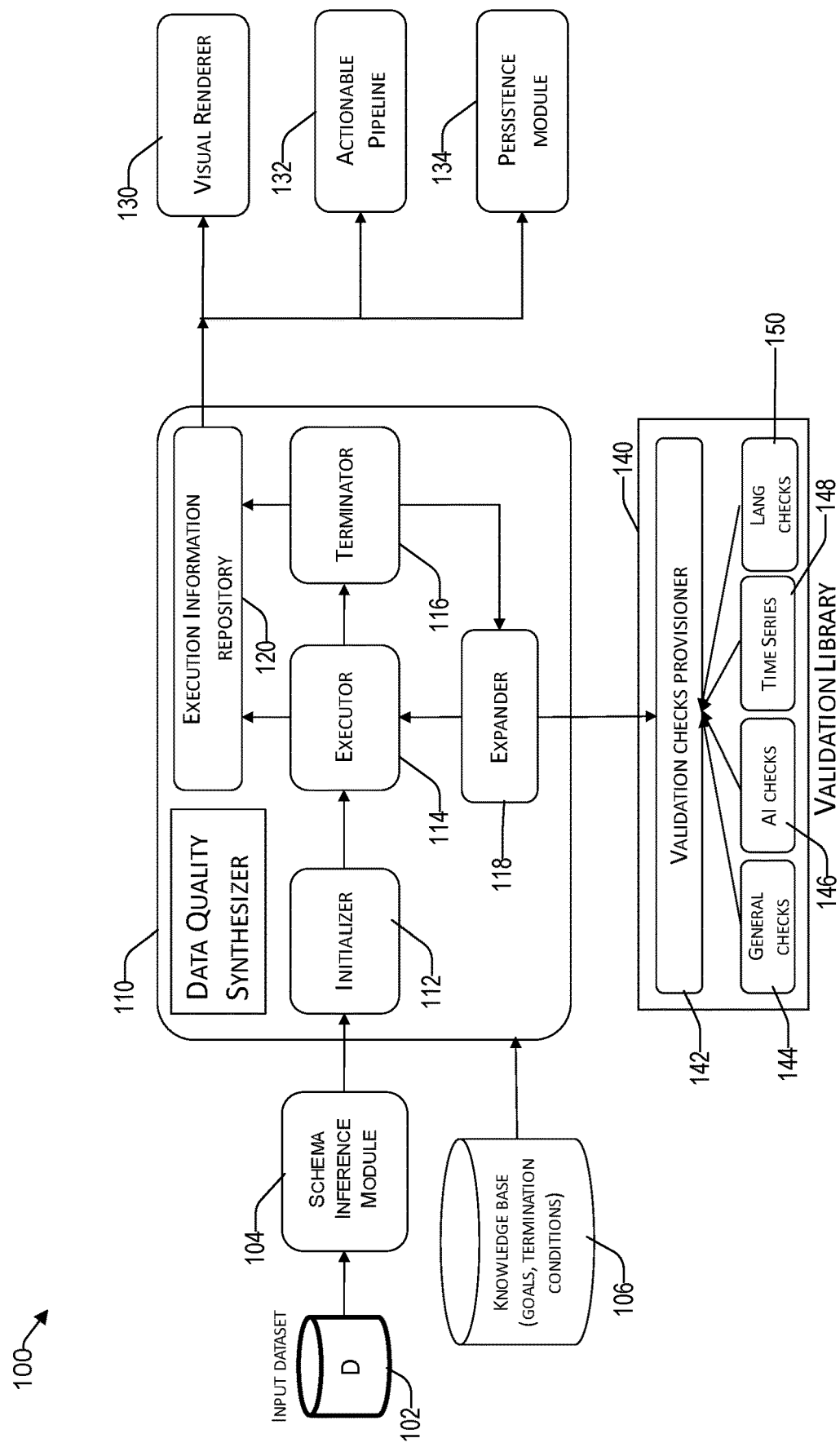
FIG. 1 is a block diagram of an example architecture of a graph-based data quality synthesizer system, consistent with an illustrative embodiment.

FIG. 1 is a block diagram of an example architecture 100 of a graph-based data quality synthesizer system, consistent with an illustrative embodiment. There is an input dataset 102 that may represent raw data that is stored in a data repository representing big data. In various embodiments, the input dataset may be homogeneous (e.g., of a similar type) or disparate in that it originates from various sources and includes different formats. The input dataset is received by a schema inference module 104 that is configured to infer schema. By way of non-limiting example, the schema may include to label the data type of each field. For example, column-1 of a table is a numeric column, column-2 of the table is Boolean etc. Understanding the schema will help identify the checks that are applicable for that column.

In one embodiment, the schema inference module 104 can determine what each row and/or column in the input dataset signifies. In various embodiments, different methods may be used. In one example, a machine learning model of the schema inference module 104 learns the schema and provides the same, as well as the input dataset, to the data quality synthesizer 110 in an automated manner. In another embodiment, there is a "human in the loop" in that a computing device of the architecture 100 receives the schema from an administrator of the input dataset 102.

The data quality synthesizer module 110 includes a graph initializer 112, an executor 114, a terminator 116, an expander 118, and an execution information repository 120. The graph initializer 112 is configured to initialize a first set of nodes in a graph for performing the validations on the data (i.e., input dataset 102). As used herein, a node is a set of checks to perform on the data. Each node in the graph represents a data quality check and corresponding remedial action(s) to transform the input dataset, discussed in more detail later.

The input to the graph initializer 112 is the input dataset 102 with its annotated schema from the schema inference module 104. The output of the graph initializer 112 is a list of validation nodes acting as a first layer in a data quality graph. A set of checks (e.g., domain-agnostic such as null-value-check, infinity values checks, column wise constant values check, number of zeros in columns, column wise unique value checks, duplicate rows checks, duplicate columns names, duplicate columns values checks, low variance columns checks, etc.,) are performed, which may be based on the schema information. For example, different types of checks are performed based on the annotated schema 104 of the input dataset 102.

The executor module 114 receives the output from the graph initializer 112 and executes operations defined by the nodes in the graph. Stated differently, the different checks are performed on the data, as defined by their nodes. In one embodiment, single node vs. multi node execution is based on the size of the dataset. In one example, as demonstrated in the FIG. 2, stage 1 can be visualized as a graph where there are 2 types of nodes: validators (checks) and operations (remediation functions). Each validator node can be connected to one or more operator nodes. The creation of the graph occurs in the graph initializer but the execution of the graph is performed by executor module (by traversing from the start node to each validator and operator as defined by the graph, any graph traversal strategy such as depth first search can be used).

In one embodiment, if an issue is identified (e.g., the output information from the executor module does not provide results that are within predetermined criteria) a notification is sent to the expander module 118 via the terminator module 116. The expander module 118 is configured to select a next set of nodes to be added to the graph based on a present output of the terminator from the executor module 114. The terminator module 116 output determines the next set of nodes to be considered. Accordingly, the expander module 118 receives the output of the terminator. For example, if the data generated by the executor module 114 is not sufficient (i.e., data generated does not satisfy the termination criterion of the terminator module), the graph terminator 116 invokes the expander module 118 to provide additional nodes to the graph. To that end, the expander module 118 may solicit a validation library 140 that provides various validation checks by its validation checks provisioner module 142. The validation checks may include general checks 144, AI checks 146, time series checks 148, as well as language (e.g., domain) checks 150.

For example, the general checks generally look at the structural features and value consistency of the data and not the content thereof. For example, the number of rows, number of columns, the similarity between rows and/or columns, missing data, zero values, negative values, etc. General checks are those that don't apply to specific data types and can be a used for many domains and data modalities. As to language checks, they related to checks that are applicable to certain domain or AI problems for a given data.

The AI checks 146 are more nuanced in that they look at the content of the data and determine whether the content is consistent with the field of operation. Any outliers are identified accordingly. For example, the outlier values can be removed or treated using operators for AI checks.

Regarding time series checks 148, the modality of the data is determined, such as seasonality or moving trend for a particular domain. For example, the time series discussed herein can relate to time-ordered data where each data value in a row is associated with a valid timestamp.

The language checks 150, sometimes referred to herein as the domain checks, filter out checks that are not pertinent to a particular domain. The number of checks performed can be substantially reduced thereby. The language checks 150 provide a progressive selection of checks that are tailored for a particular field of operation. One or more of these checks 144 to 150 can be selected based on the schema of the input dataset.

In one embodiment, each iteration of the execution by the executor module 114 is stored in the execution information repository 120. The execution information repository 120 represents a storage of all data quality checks and actions performed per the nodes in the graph. For example, this repository can be used to learn automatically the functions of graph expander and graph terminator.

Thus, the execution information repository is dynamically updated after each execution of a set of nodes. The terminator module 116 is configured to decide when to terminate this iterative process of adding new nodes to the graph. The iterative process continues until the terminator 116 deems the information provided by the executor module 114 to meet predetermined criteria. For example, the number of successful tests reaches a predetermined threshold.

Figure 2:
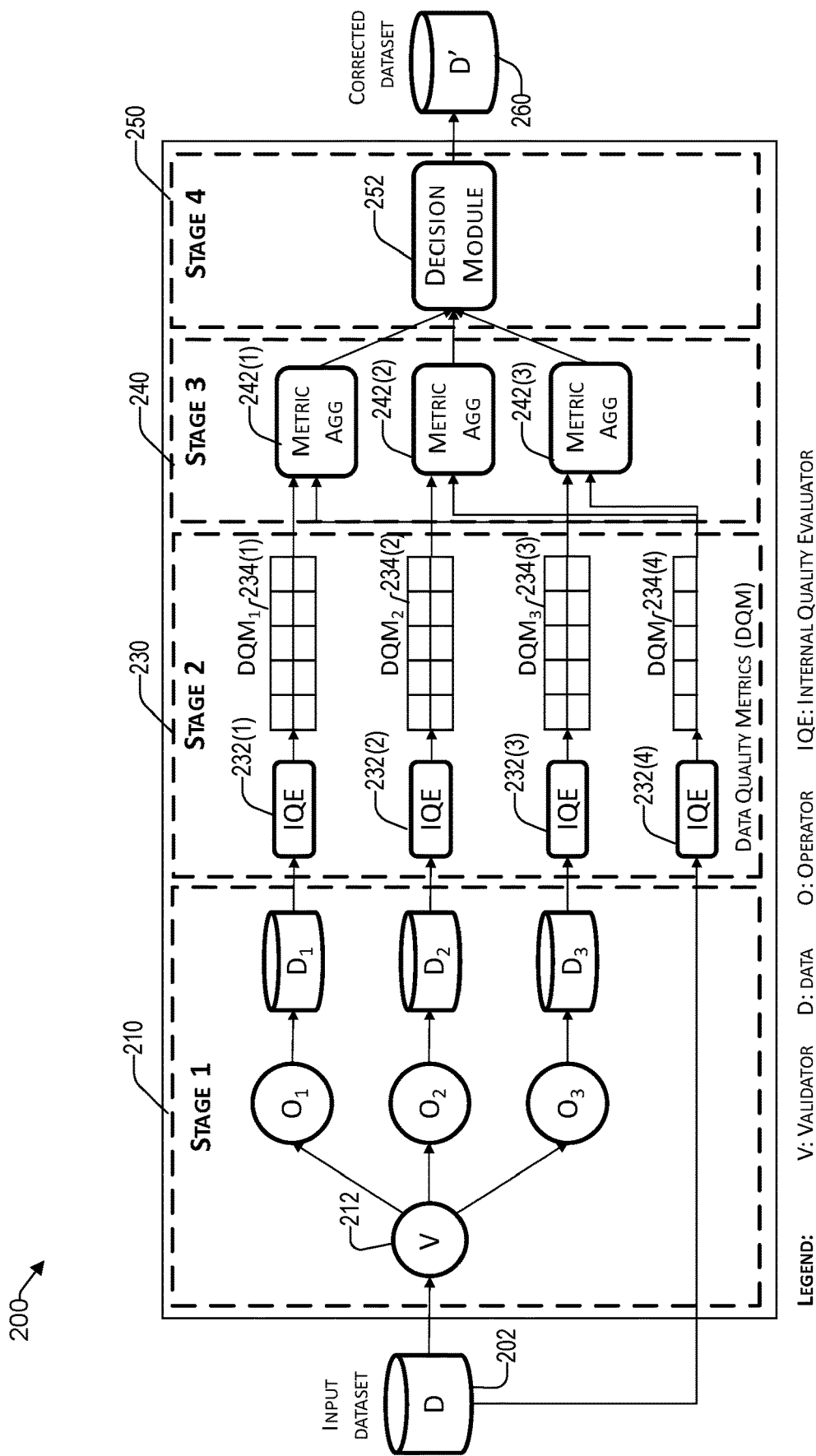
FIG. 2 provides a high-level block diagram of a validation node, consistent with an illustrative embodiment.

Reference now is made to FIG. 2, which provides a high-level block diagram of a validation node 200, consistent with an illustrative embodiment. In the example of FIG. 2, a validation node 200 includes four stages: stage 1 (210), stage 2 (230), stage 3 (240), and stage 4 (250). The node 200 represents a self-contained module for detecting and operating on an input dataset 202 (D). The input to the validation node 200 is the raw data from the input dataset 202 (D) having quality issues. The output is a corrected dataset, represented by block 260 (D'). The architecture of the system of FIG. 2 is discussed in more detail below.

In stage 1 (210), the raw data is received from the input dataset 202 by a validator object 212, where a logical check is performed. As used herein a logical check includes that the system checks for a given condition, and if that condition is satisfied, it will return the results according to the logic. There are a plurality of operators $O_1$, $O_2$, $O_3$, in which different types of data transformation can be performed to produce new versions of the data, represented by $D_1$, $D_2$, and $D_3$. While three operators are illustrated by way of example, it will be understood that any number of operators may be used based on the desired resolution desired.

Figure 3:
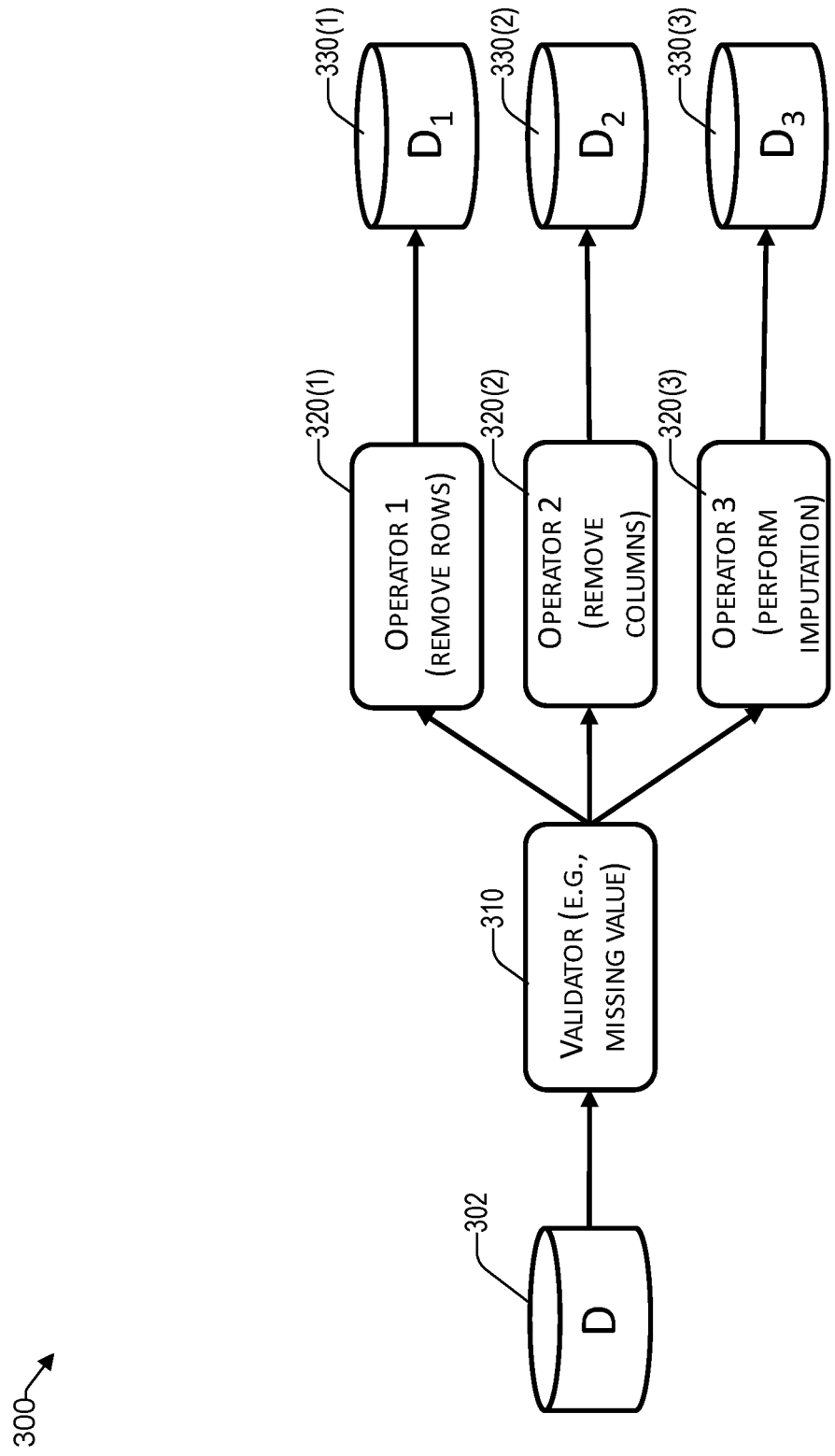
FIG. 3 provides a block diagram of stage 1 of FIG. 2, consistent with an illustrative embodiment.

Reference now is made to FIG. 3, which provides a block diagram of stage 1 of FIG. 2, consistent with an illustrative embodiment. The main logical check of the raw data 302 is performed by the validator block 310. The input to the validator block 3310 is the raw data 302, which may include potential errors. The validator block 310 is configured to detect anomalies in the raw data. If anomalies are detected in the data, the validator 310 has can perform corrective operations on the received raw data 302.

The validator can choose different corrective actions, referred to herein as operators (e.g., 320(1) to 320(3)). For example, the validator 310 can be a detector, such as a missing value detector, duplicate value detector, etc. The corresponding operators 320(1) to 320(3) are configured to provide the appropriate corrective action, such as removing rows, removing columns, and/or performing data imputation.

The output of each of these corrective operations 320(1) to 320(3) is a new version of the dataset, where the potential issue has been resolved, represented by $D_1$ to $D_3$ (330(1) to 330(3)). Referring back to FIG. 2, one salient aspect of a data quality advisor (DQA) is that the validators and the possible operators are linked. The DQA refers to the entire system described herein. Each validator has pointers to a set of callable operations $O_1$ to $O_3$, which can be invoked if the validation fails. This allows for automated management of corrections once the anomalies are detected.

In stage 2 (230), for each of the new version of data generated, Data Quality Metrics (DQM) (234 (1) to 234(4)) for each of these is generated using a corresponding Internal Quality Evaluator (IQE) (232(1) to 232(4)). In various embodiments, an IQE can be realized as one common block or as multiple blocks. The parameters can be different for each path. The metrics can be recommended by a user as well. Each IQE is called out differently to illustrate the comparisons being performed, for example, IQE 232(1) is comparing the datasets D1 and D whereas 232(2) is comparing the datasets D2 and D, and so forth. The content of each DQM provides a summary of various characteristics of data in multiple dimension. The content may have multiple "Quality Scorers," such as an automated modeling fit, a stability detector, a cohort analyzer, similarity detection, etc. The content of each DQM may further include gain or change information of the data from the previous version. It is noted that the raw data from the input dataset 202 (D) also goes through its corresponding IQE 232(4) and DQM 234(4) for later comparison. In one embodiment, the volume of data can be reduced if the operator for remediating missing values is to delete all the rows where missing values are present. In that case, V is the missing value check, O is deletion of all rows, and IQE provides a comparison of how much data reduction happened.

Figure 4:
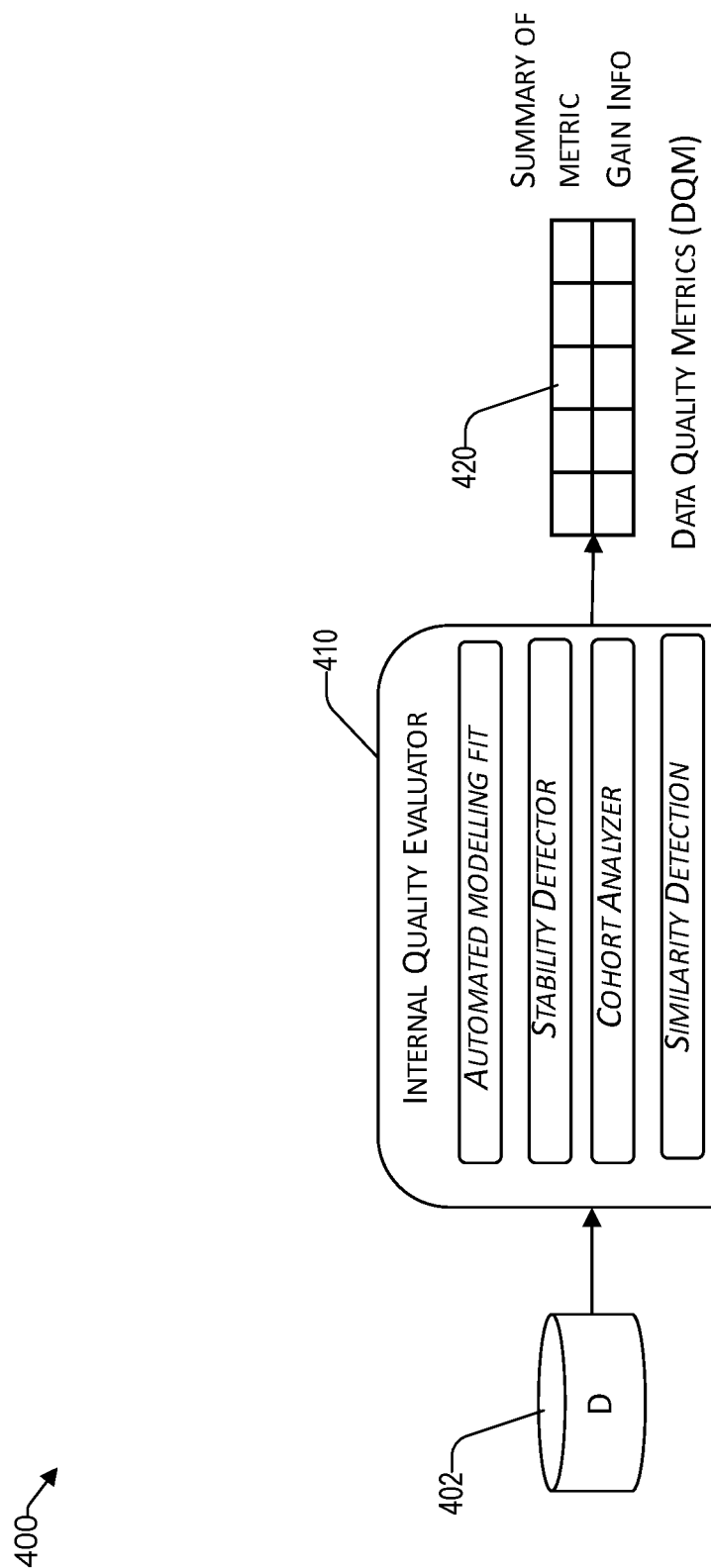
FIG. 4 provides a block diagram of a path of stage 2 of FIG. 2, consistent with an illustrative embodiment.

Reference now is made to FIG. 4, which provides a block diagram of a path of stage 2 of FIG. 2, consistent with an illustrative embodiment. The quality metrics for the incoming data 402 and the new data is generated by the internal quality evaluator (IQE) 410. The IQE 410 is used for finding intrinsic quality metric(s) for a given dataset 402. As illustrated in FIG. 4, any dataset D 402 can be passed to the IQE 410 to output the Data Quality Metrics (DQM) 420. In various embodiments, the IQE 410 can use different techniques independently or together to assess different quality metrics. For example, the IQE 410 can use an automated modeling fit to assess the data's ability to fit a regression and/or classification model. The IQE 410 can use a stability detector to detect how statistically stable the data 402 is. Further, it can use a cohort analyzer to determine how many clusters exist in the data 402. Symmetry detection can be used to determine whether the distribution of the data around the mean is symmetric. Still further, similarity detection and other techniques can be used.

The output of IQE 410 is the Data Quality Metric (DQM) 420, which, in one embodiment, provides two main types of information. First, the DQM 420 provides a summary of various characteristics of data in multiple dimensions (e.g., multiple statistical values or multiple types of quality metrics discussed herein). The IQE 410 may have multiple quality scorers, such as, without limitation, an automated modeling fit, stability Detector, cohort Analyzer, similarity detection, etc., as illustrated in FIG. 4. Second, the DQM 420 may provide gain or change information of the data from the previous version.

Referring back to FIG. 2, in stage 3 (240), each of the transformed data from its corresponding DQM is aggregated (e.g., compared) to the original raw data from the input dataset 202 (D), which has been processed by the IQE 232(4) and DQM 234(4), by its corresponding metric aggregator block 242(1) to 242(2), respectively). For example, the various data quality metrics (DQM) are compared to see how much change is observed in the newly generated data from the operator to the original data. The purpose of doing this is to evaluate the effectiveness of the check and the operator. Since DQMs are arrays, values are aggregated before they are compared.

In stage 4, the aggregated scores are passed to the decision module 252 to select the appropriate operator to use. This decision can be made based on various criteria, which may include, without limitation, administrator choice, recommendation based, and/or automated. In one embodiment, each metric aggregator block 242 provides a measure of a gap between the altered data provided from its path from stage 2 and the data provided by the output of the DQM 234(4). In this way, each metric aggregator can determine which dataset to use (e.g., D1, D2, or D3). The larger the gap between its path and the output from DQM 234(4), the more significantly the original raw data D was changed, and hence, improved. In this regard, the decision module 252 of stage 4 selects a dataset (e.g., D1, D2, or D3) based on the scores and decision criteria. In one embodiment, the larger the gap between the altered data and the original dataset as measured by the metric aggregator in each path of data, the more desirable the dataset. However, in one embodiment, if the gap is above a predetermined threshold, then the altered dataset is disqualified as it may be based on error. Thus, the decision module 252 may select a dataset (D1, D2, or D3) based on a highest gap but the gap being below a predetermined threshold. Stated differently, the most appropriate gap is selected. The gap should be sufficient in a positive direction. Secondly, the gap should not be too much such that the data does not resemble the original data based on predetermined criteria. Accordingly, the multiple DQMs (which are arrays of statistical values) are compared using array comparison and distance calculation methods. These in-turn provide insight about the gap between the new and the raw data, since DQMs are representatives of the data they are calculated on. As explained above, the gap between the two datasets should be appropriate.

Figure 5:
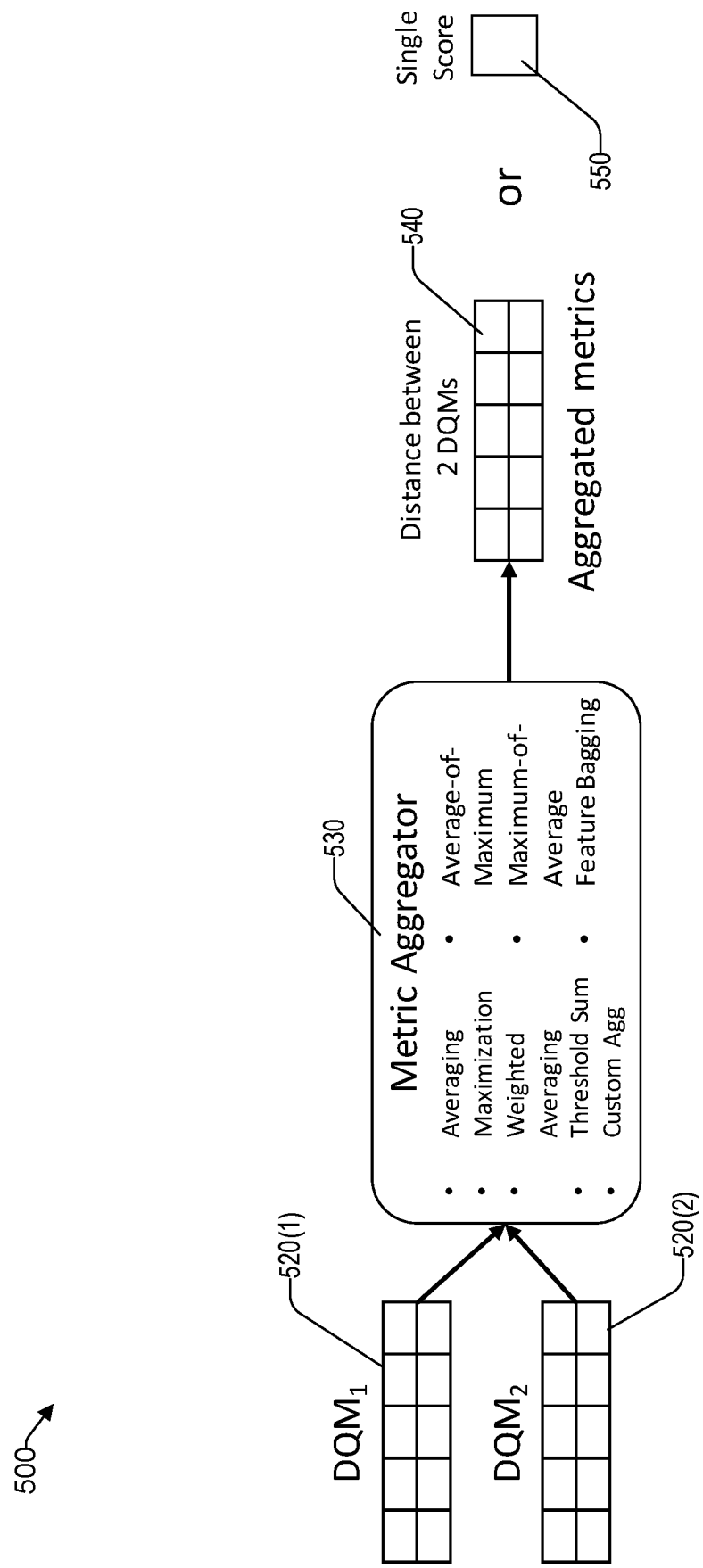
FIG. 5 provides a block diagram of a path of stage 3 of FIG. 2, consistent with an illustrative embodiment.

Reference now is made to FIG. 5, which provides a block diagram of a path of stage 3 of FIG. 2, consistent with an illustrative embodiment. The metrics for the new dataset

520(1) and the old dataset 520(2) are compared by the metric aggregator block 530 to determine which operation is more effective in improving the dataset. The larger the gap between the new dataset 520(1) and the old dataset 520(2), the higher the score. Such comparison of the data metrics between the two datasets can be performed by aggregation. The techniques used in aggregation may include, without limitation: averaging, maximization, weighted averaging, threshold sum, custom aggregation, average-of-maximum, maximum-of-average, feature bagging, etc. In various embodiments, the result can be aggregated metrics 540 and/or a single similarity/distance score 550 for characterizing the improvements in the data.

Figure 6:
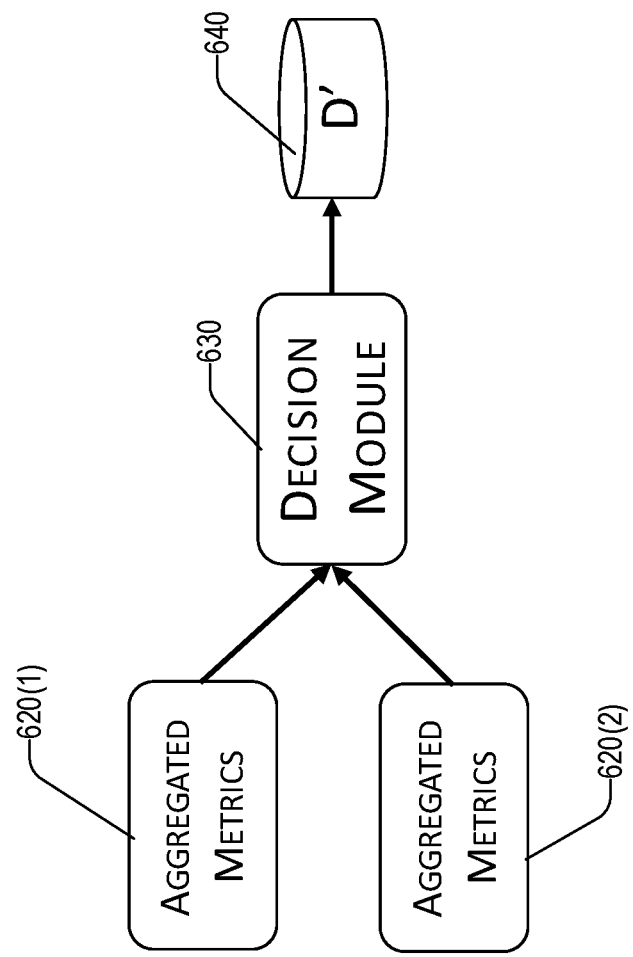
FIG. 6 is a block diagram of stage 4 of FIG. 2, consistent with an illustrative embodiment.

FIG. 6 is a block diagram of stage 4 of FIG. 2, consistent with an illustrative embodiment. The decision module 630 is configured to select between the datasets 620(1) and 620(2) based on scores discussed in the context of FIG. 5 and predetermined decision criteria. In various embodiments, the criteria identified may be (i) automated (e.g., once the aggregated metrics for each operation is calculated in stage 3, these are used to make a decision in the node for which operator to finally leverage); (ii) administrator choice (e.g., letting the administrator provide their decision on which operator to choose), and/or (iii) recommendation based (e.g., learn over time for which operation works best with the given data.

Example Process

Figure 7:
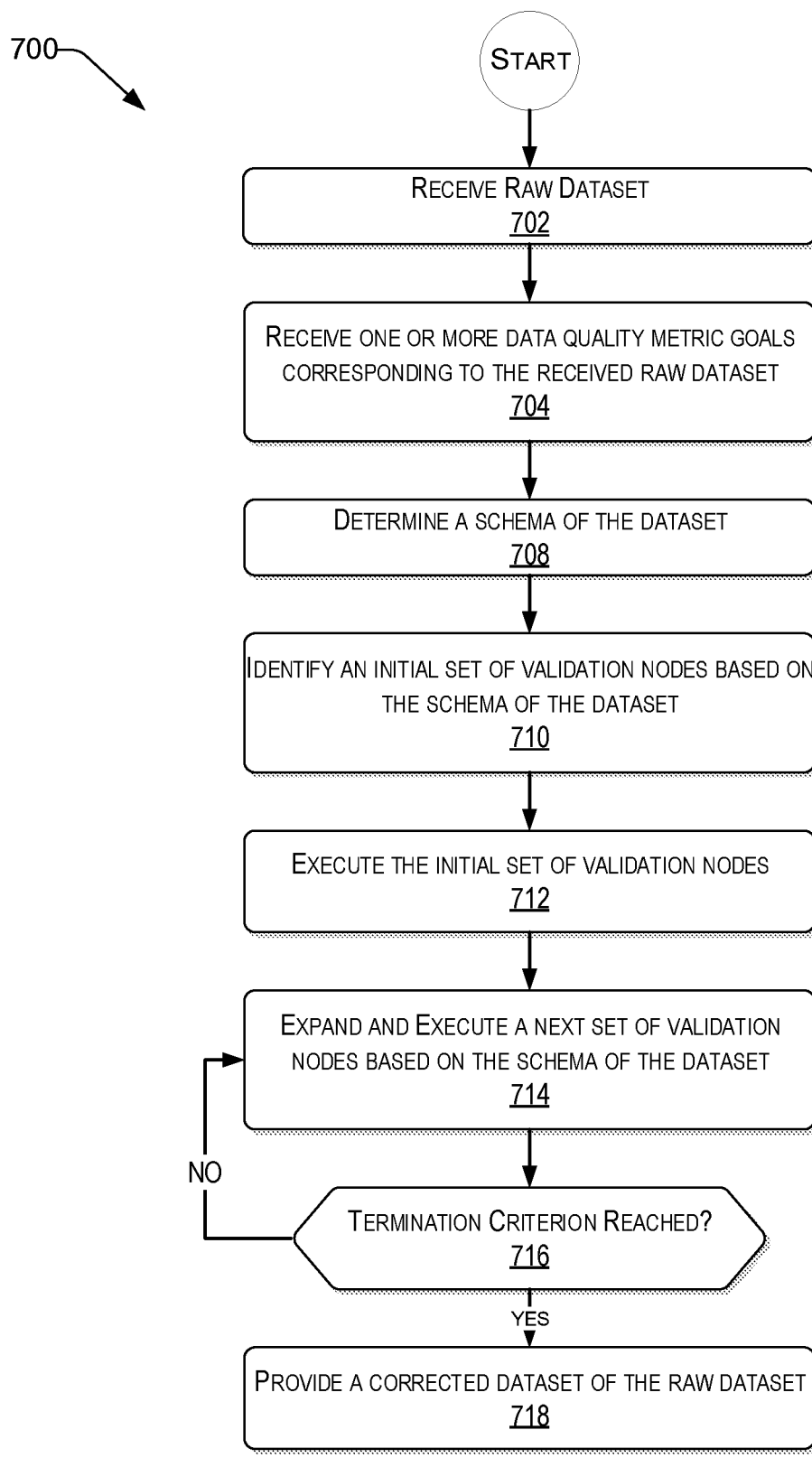
FIG. 7 presents an illustrative process related to improving data quality to conserve computational resources, consistent with an illustrative embodiment.

With the foregoing overview of the example architecture 100 and validation node 200, it may be helpful now to consider a high-level discussion of an example process. To that end, FIG. 7 presents an illustrative process related to improving data quality to conserve computational resources. Process 700 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 700 is described with reference to the architecture 200 of FIG. 2.

At block 702, a computing device receives a raw dataset 202.

At block 704, one or more data quality metric goals corresponding to the received raw dataset are received. As used herein, the term "data quality metric goals" refers to the combination of metrics and configurations, which can be provided by the user before the system runs. This includes the data quality metrics as well as the termination criterion.

At block 708, a schema of the dataset is determined.

At block 710, an initial set of validation nodes is identified based on the schema of the dataset.

At block 712, the initial set of validation nodes are executed.

At block 714, a next set of validation nodes are iteratively expanded and executed based on the schema of the dataset until a termination criterion is reached. Upon determining that the termination criterion is met (i.e., "NO" at decision block 716), the iterative process continues. However, upon determining that the termination criterion is met, (i.e., "YES" at decision block 716), the process goes to block 718, where a corrected dataset of the raw dataset is provided based on the iterative execution of the initial and next set of validation nodes.

Example Computer Platform

Figure 8:
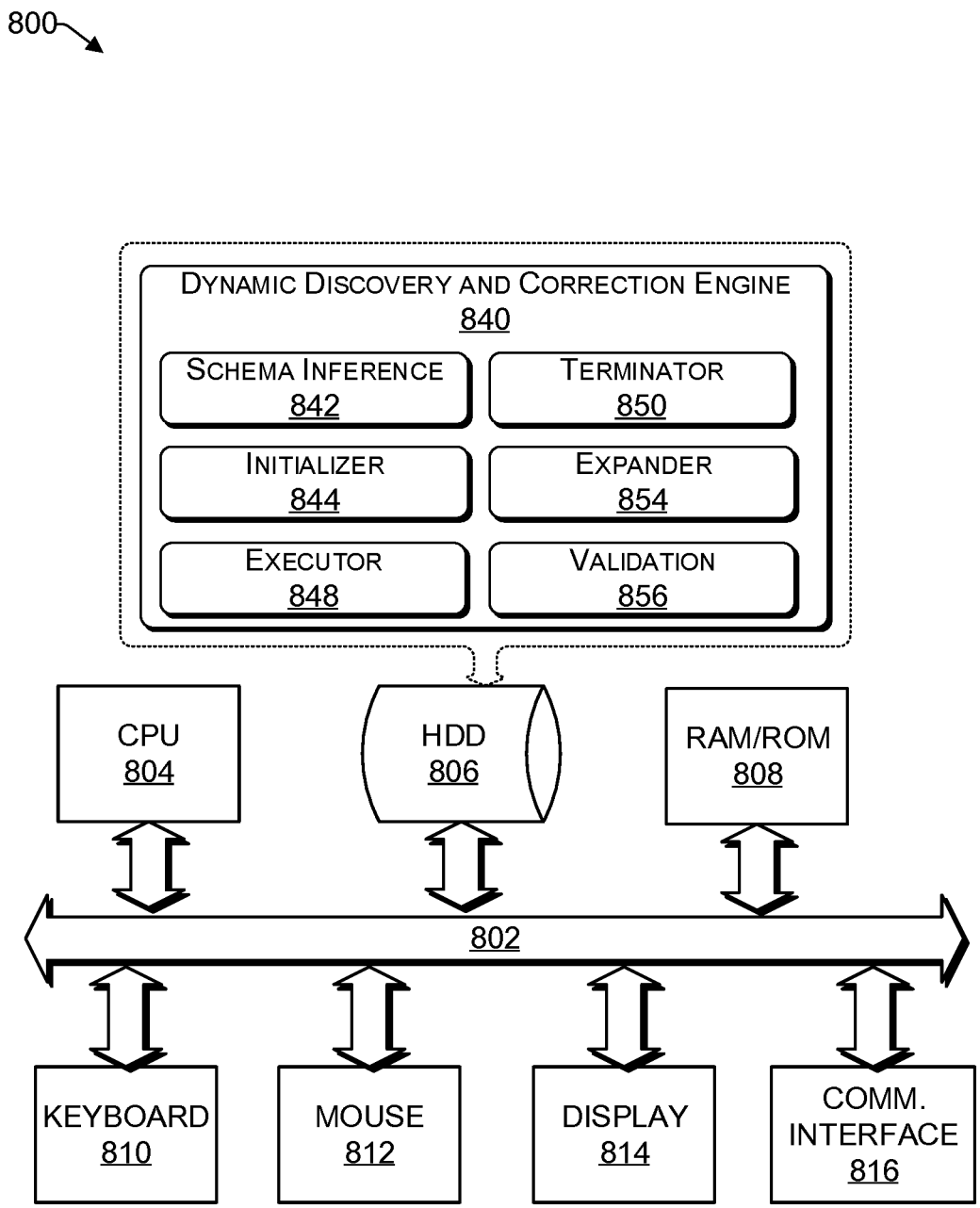
FIG. 8 provides a functional block diagram illustration of a computer hardware platform that can be used to implement a particularly configured computing device that can host a dynamic discovery and correction engine.

As discussed above, functions relating to automatically matching a task to a participant, can be performed with the use of one or more computing devices connected for data communication via wireless or wired communication, as shown in FIG. 1 and in accordance with the process 400 of FIG. 4. FIG. 8 provides a functional block diagram illustration of a computer hardware platform 800 that can be used to implement a particularly configured computing device that can host a dynamic discovery and correction engine 840. Accordingly, the computer hardware platform 800 is capable of communicating with various databases, knowledge bases, validation libraries, etc., as discussed herein. In particular, FIG. 8 illustrates a network or host computer platform 800, as may be used to implement an appropriately configured server.

The computer platform 800 may include a central processing unit (CPU) 804, a hard disk drive (HDD) 806, random access memory (RAM) and/or read only memory (ROM) 808, a keyboard 810, a mouse 812, a display 814, and a communication interface 816, which are connected to a system bus 802.

In one embodiment, the HDD 806, has capabilities that include storing a program that can execute various processes, such as the dynamic discovery and correction engine 840, in a manner described herein. The dynamic discovery and correction engine 840 may have various modules configured to perform different functions.

For example, there may be schema inference module 842 that is operative to receive the raw dataset and infer a schema thereof. There may be an initializer module 844 operative to initialize a first set of nodes in a graph for performing the validations on the raw dataset. There may be an executor module 848 operative to receives the output from the initializer 844 and execute operations defined by the nodes in the graph provided by the initializer 844. There may be a terminator module 850 operative to determine a next set of nodes to be considered for execution and provide a termination signal when a criterion is met, as discussed herein. There may be an expander module 854 operative to select a next set of nodes to be added to the graph based on a present output of the terminator 850 from the executor module 848. There may be a validation module 856 operative to provide various validation checks including, without limitation, general checks, AI checks, time series checks, and language checks, as discussed herein.

Example Cloud Platform

As discussed above, functions relating to matching a participant to a task may include a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of microservice delivery for enabling convenient, on-demand network access to a shared pool of configurable computing resources (e.g., networks, network bandwidth, servers, processing, memory, storage, applications, virtual machines, and microservices) that can be rapidly provisioned and released with minimal management effort or interaction with a provider of the microservice. This cloud model may include at least five characteristics, at least three microservice models, and at least four deployment models.

Characteristics are as follows:

On-demand self-service: a cloud consumer can unilaterally provision computing capabilities, such as server time and network storage, as needed automatically without requiring human interaction with the microservice's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured microservice: cloud systems automatically control and optimize resource use by leveraging a metering capability at some level of abstraction appropriate to the type of microservice (e.g., storage, processing, bandwidth, and active user accounts). Resource usage can be monitored, controlled, and reported, providing transparency for both the provider and consumer of the utilized microservice.

Service Models are as follows:

Software as a microservice (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a microservice (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a microservice (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud microservices.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is microservice oriented with a focus on statelessness, low coupling, modularity, and semantic interoperability. At the heart of cloud computing is an infrastructure that includes a network of interconnected nodes.

Figure 9:
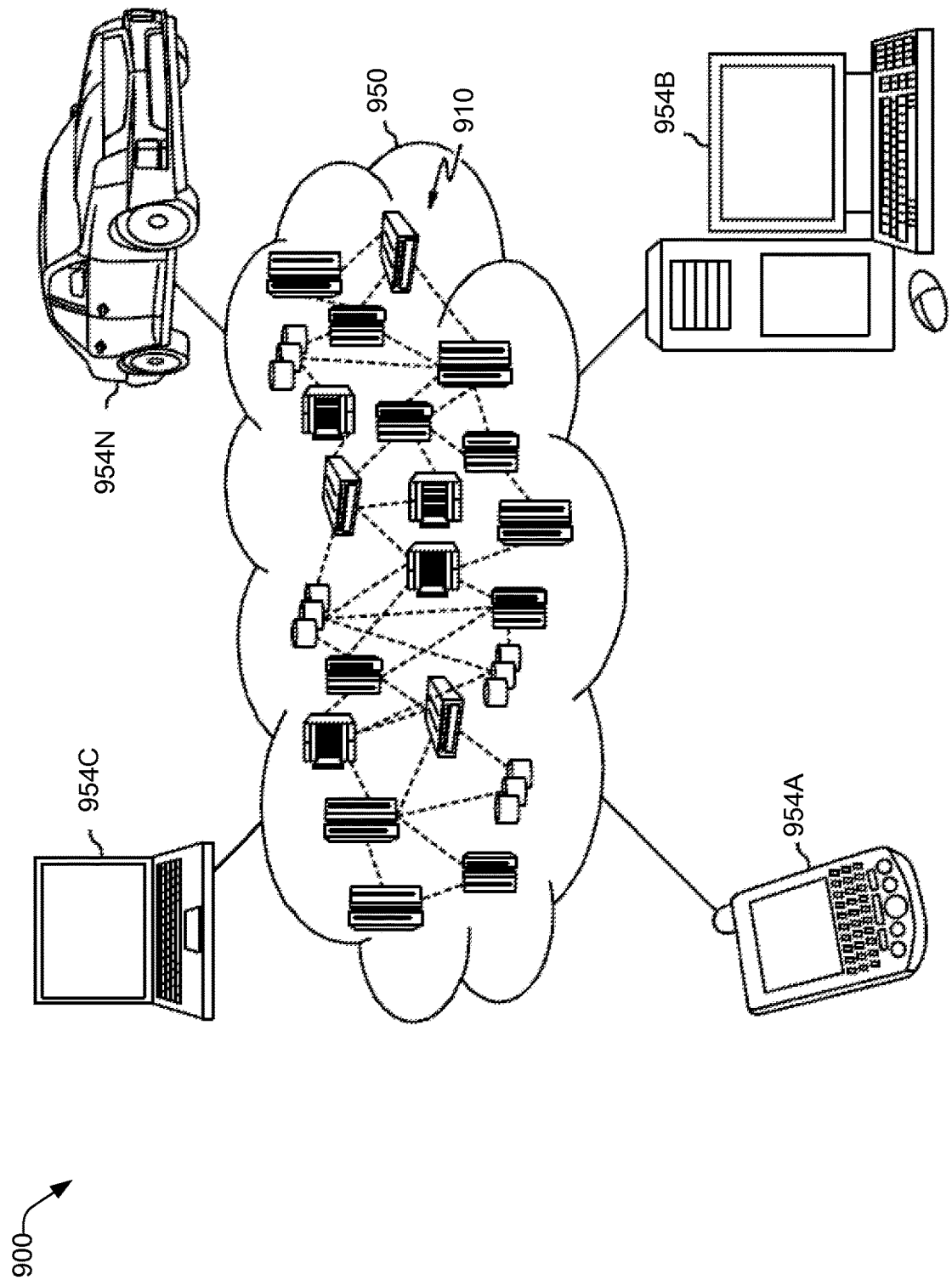
FIG. 9 provides a cloud computing environment, consistent with an illustrative embodiment.

Referring now to FIG. 9, an illustrative cloud computing environment 900 is depicted. As shown, cloud computing environment 900 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as microservices for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
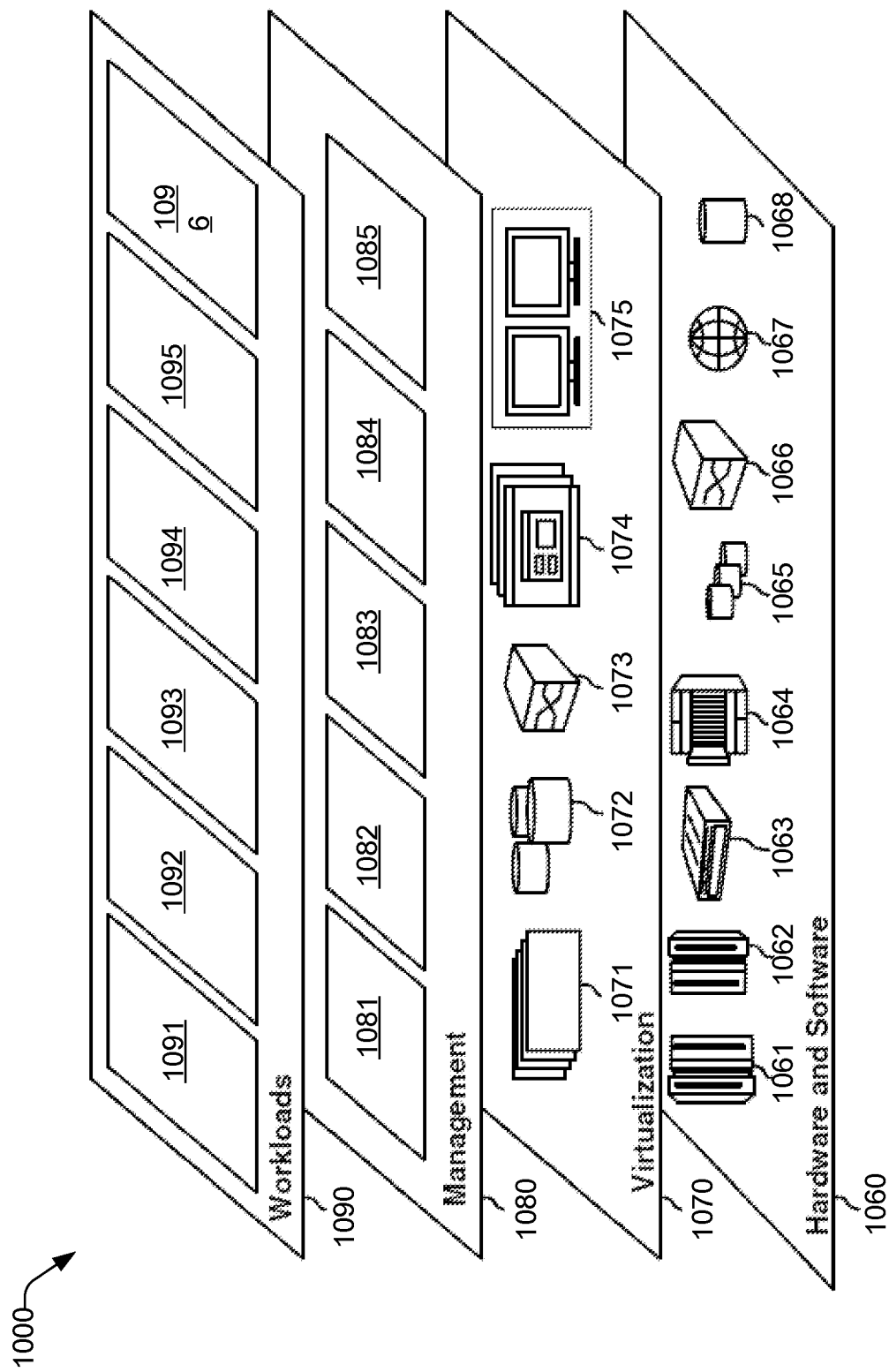
FIG. 10 is a set of functional abstraction layers by the cloud computing environment of FIG. 9, consistent with an illustrative embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the disclosure are not limited thereto. As depicted, the following layers and corresponding functions are provided:

Hardware and software layer 1060 includes hardware and software components. Examples of hardware components include: mainframes 1061; RISC (Reduced Instruction Set Computer) architecture-based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. microservice level management 1084 provides cloud computing resource allocation and management such that required microservice levels are met. microservice Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and dynamic discovery and correction engine 1096, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a storage device coupled to the processor;
an engine stored in the storage device, wherein an execution of the engine by the processor configures the computing device to perform acts comprising:
receiving a raw dataset;
receiving one or more data quality metric goals, corresponding to the received raw dataset;
determining a schema of the dataset;
identifying an initial set of validation nodes based on the schema of the dataset, wherein each validation node includes a data quality check;
executing the initial set of validation nodes;
iteratively expanding and executing a next set of validation nodes based on the schema of the dataset until a termination criterion including a number of successful tests reaching a predetermined threshold, is achieved; and
providing a corrected dataset of the raw dataset based on the iterative execution of the initial and next set of validation nodes.

2. The method of claim 1, wherein each validation node includes a data quality check and one or more remediation actions.

3. The method of claim 1, wherein execution of a validation node of the initial set of validation nodes comprises:
identifying all possible remediation actions for any data quality check;
transforming the data with each possible remediation action; and
computing a plurality of data quality metrics (DQMs) to evaluate the transformations.

4. The method of claim 1, wherein execution of a validation node includes a first stage, comprising:
performing a logical check of the raw dataset by a validator object to detect one or more anomalies in the raw dataset; and
performing different data transformations by way of a corresponding operator on the raw dataset to produce a new version of data for each data transformation, to correct the one or more detected anomalies.

5. The method of claim 4, wherein execution of the validation node includes a second stage comprising:
for each new version of data produced, generating a data quality metric (DQM) by an internal quality evaluator (IQE) module; and
generating a DQM for the raw dataset.

6. The method of claim 5, wherein each DQM of the second stage comprises at least one of (i) a summary of characteristics in multiple dimensions of the corresponding new version of data produced from the raw dataset; or (ii) a gain or change information of the corresponding new version of data produced from the raw dataset.

7. The method of claim 5, wherein execution of the validation node includes a third stage comprising:
for each DQM of each new version of data produced and the DQM of the raw dataset, performing a comparison to the raw dataset to assess an improvement from the raw dataset.

8. The method of claim 7, wherein execution of the validation node includes a fourth stage comprising:
selecting the operator of the new version of data produced that best meets the data quality metric goals.

9. The method of claim 8, wherein the operator that is selected has a highest gap between its corresponding DQM and the DQM of the raw dataset that is below a predetermined threshold.

10. The method of claim 1, wherein expanding a next set of validation nodes comprises at least one of:
determining a validation node that best achieves one or more received quality metric goals; or
determining a validation node based on mining an execution information repository to find all validation nodes that usually occur together.

11. A non-transitory computer readable storage medium tangibly embodying a computer readable program code having computer readable instructions that, when executed, causes a computer device to carry out a method of improving data quality to conserve computational resources, the method comprising
receiving a raw dataset;
receiving one or more data quality metric goals corresponding to the received raw dataset;
determining a schema of the dataset;
identifying an initial set of validation nodes based on the schema of the dataset;
executing the initial set of validation nodes;
iteratively expanding and executing a next set of validation nodes based on the schema of the dataset until a termination criterion including a number of successful tests reaching a predetermined threshold, is achieved; and
providing a corrected dataset of the raw dataset based on the iterative execution of the initial and next set of validation nodes.

12. The non-transitory computer readable storage medium of claim 11, wherein each validation node includes one or more remediation actions.

13. The non-transitory computer readable storage medium of claim 11, wherein execution of a validation node of the initial set of validation nodes comprises:
    identifying all possible remediation actions for each data quality check;
    transforming the data with each possible remediation action; and
    computing a plurality of data quality metrics (DQMs) to evaluate the transformations.

14. The non-transitory computer readable storage medium of claim 11, wherein execution of a validation node includes:
    a first stage, comprising:
        performing a logical check of the raw dataset by a validator object to detect one or more anomalies in the raw dataset; and
        performing different data transformations by way of a corresponding operator on the raw dataset to produce a new version of data for each data transformation, to correct the one or more detected anomalies;
    a second stage, comprising:
        for each new version of data produced, generating a data quality metric (DQM) by an internal quality evaluator (IQE) module; and
        generating a DQM for the raw dataset;
    a third stage, comprising:
        for each DQM of each new version of data produced, performing a comparison to the raw dataset to assess an improvement from the raw dataset; and
    a fourth stage, comprising:
        selecting the operator of the new version of data produced that best meets the data quality metric goals.

15. The non-transitory computer readable storage medium of claim 14, wherein the operator that is selected has a highest gap between its corresponding DQM and the DQM of the raw dataset that is below a predetermined threshold.

16. The non-transitory computer readable storage medium of claim 11, wherein expanding a next set of validation nodes comprises at least one of:
    determining a validation node that best achieves one or more of the data quality metric goals; or
    determining a validation node based on mining an execution information repository to find all validation nodes that usually occur together.

17. A method comprising:
    receiving a raw dataset and to determine a schema of the raw dataset; and
    receiving one or more data quality metric goals corresponding to the received raw dataset from a knowledge base;
        identifying an initial set of validation nodes based on the schema of the dataset;
        executing the initial set of validation nodes;
        iteratively expanding and executing a next set of validation nodes based on the schema of the dataset, until a termination criterion, including a number of successful tests reaching a predetermined threshold, is achieved; and
        iteratively determining the next set of validation nodes to consider by the expander module and to decide when to terminate the iterative determination; and
    providing a corrected dataset of the raw dataset based on the iterative execution of the initial and next set of validation nodes.

18. The method of claim 17, wherein each validation node includes a data quality check and one or more remediation actions.

19. The method of claim 17, wherein the initial set of validation nodes are configured to:
    identify all possible remediation actions for any data quality check;
    transform the data with each possible remediation action; and
    compute a plurality of data quality metrics to evaluate the transformations.

20. The method of claim 17, wherein each validation node comprises:
    a first stage configured to:
        perform a logical check of the raw dataset by a validator object to detect one or more anomalies in the raw dataset; and
        perform different data transformations by way of a corresponding operator on the raw dataset to produce a new version of data for each data transformation, to correct the one or more detected anomalies;
    a second stage configured to:
        for each new version of data produced, generate a data quality metric (DQM) by an internal quality evaluator (IQE) module; and
        generate a DQM for the raw dataset;
    a third stage configured to:
        for each DQM of each new version of data produced, perform a comparison to the raw dataset; and
    a fourth stage configured to:
        select the operator of the new version of data produced that best meets the data quality metric goals.

21. A computer implemented method of improving data quality to conserve computational resources, the method comprising
    receiving a raw dataset;
    receiving one or more data quality metric goals corresponding to the received raw dataset;
    determining a schema of the dataset;
    identifying an initial set of validation nodes based on the schema of the dataset, wherein each validation node includes a data quality check;
    executing the initial set of validation nodes;
    iteratively expanding and executing a next set of validation nodes based on the schema of the dataset until a termination criterion including a number of successful tests reaching a predetermined threshold, is achieved; and
    providing a corrected dataset of the raw dataset based on the iterative execution of the initial and next set of validation nodes.

22. The computer implemented method of claim 21, wherein each validation node includes a data quality check and one or more remediation actions.

23. The computer implemented method of claim 21, wherein execution of a validation node of the initial set of validation nodes comprises:
    identifying all possible remediation actions for each data quality check;
    transforming the data with each possible remediation action; and
    computing a plurality of data quality metrics (DQMs) to evaluate the transformations.

24. The computer implemented method of claim 21, wherein execution of a validation node includes:
    a first stage, comprising:
        performing a logical check of the raw dataset by a validator object to detect one or more anomalies in the raw dataset; and performing different data transformations by way of a corresponding operator on the raw dataset to produce a new version of data for each data transformation, to correct the one or more detected anomalies;

a second stage, comprising:
for each new version of data produced, generating a data quality metric (DQM) by an internal quality evaluator (IQE) module; and
generating a DQM for the raw dataset;

a third stage, comprising:
for each DQM of each new version of data produced, performing a comparison to the raw dataset; and a fourth stage, comprising:
selecting the operator of the new version of data produced that best meets the data quality metric goals.

25. The computer implemented method of claim 21, wherein expanding a next set of validation nodes comprises at least one of:
determining a validation node that best achieves one or more received quality metric goals; or
determining a validation node based on mining an execution information repository to find all validation nodes that usually occur together.

* * * * *